US007924479B2

(12) United States Patent
Nogami

(10) Patent No.: US 7,924,479 B2
(45) Date of Patent: Apr. 12, 2011

(54) IMAGE READING APPARATUS FOR READING A DOCUMENT POSITIONED ON A PLATE

(75) Inventor: Ryuji Nogami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 890 days.

(21) Appl. No.: 11/781,114

(22) Filed: Jul. 20, 2007

(65) Prior Publication Data

US 2008/0024750 A1 Jan. 31, 2008

(30) Foreign Application Priority Data

Jul. 28, 2006 (JP) .................................. 2006-205946

(51) Int. Cl.
*H04N 1/04* (2006.01)
*H04N 1/40* (2006.01)

(52) U.S. Cl. ........................................ 358/488; 358/474

(58) Field of Classification Search .................. 358/401, 358/449, 451, 471, 474, 486, 488; 399/380; 16/366; 355/75
See application file for complete search history.

(56) References Cited

U.S. PATENT DOCUMENTS

| 5,327,261 | A  | * | 7/1994  | Hirota et al.       | 358/449 |
|-----------|----|---|---------|---------------------|---------|
| 7,136,201 | B2 | * | 11/2006 | Kawasaki et al.     | 358/474 |
| 2002/0166208 | A1 | * | 11/2002 | Kondo et al.     | 16/289  |
| 2003/0133730 | A1 | * | 7/2003  | Conard-White et al. | 399/380 |
| 2006/0139703 | A1 | * | 6/2006  | Kurokawa et al.  | 358/474 |
| 2007/0223060 | A1 | * | 9/2007  | Ikeno et al.     | 358/497 |

FOREIGN PATENT DOCUMENTS

JP 2006-184691 A 7/2006

\* cited by examiner

*Primary Examiner* — Gabriel I Garcia
(74) *Attorney, Agent, or Firm* — Canon U.S.A., Inc., IP Division

(57) ABSTRACT

An image reading apparatus configured to read a document positioned on a document positioning plate includes an apparatus body, the document positioning plate mounted on the apparatus body, a document cover configured to press the document against the document positioning plate, a hinge member attached to the document cover and rotatably attached to the apparatus body, and a switch member engaging with the hinge member and configured to restrict a rotation angle of the hinge member. The switch member is located on a same side as a side of the document positioning plate of the apparatus body and is configured to restrict, at a first position thereof, the rotation angle to a first open angle and to release, at a second position thereof, the rotation angle from being restricted to the first open angle.

14 Claims, 5 Drawing Sheets

IMAGE READING APPARATUS FOR READING A DOCUMENT POSITIONED ON A PLATE

BACKGROUND OF THE INVENTION

1. Field of the Invention

The present invention relates to an image reading apparatus configured to read a document positioned on a document positioning plate, and a cover assembly for use with an image reading apparatus configured to cover a document placed on a document positioning plate.

2. Description of the Related Art

Conventionally, most document covers (original covers or platen covers) attached to conventional image reading apparatuses are configured to be opened at one position. However, if a document having a size larger than that of a document positioning glass plate is placed thereon, the document sometimes cannot be properly positioned on the document positioning plate because of the document cover opening only up to approximately 90 degrees.

U.S. Patent Application Publication No. US 2006/0139703 A1 discusses an image reading apparatus having a configuration in which two positions are provided for a pivot that couples a document cover to the image reading apparatus. In this configuration, the pivot can be moved between the two positions to switch between the state in which the document cover is open at an angle of approximately 90 degrees and the state in which the document cover is open at an angle of 180 degrees or more. Japanese Patent Application Laid-Open No. 2006-184691 discusses a configuration in which the angle of a document cover at the open position can be changed.

In one conventional method for moving the position of the pivot of a document cover to change the open angle of the document cover, operations for moving the pivot are difficult for a user to understand, and it is also difficult to identify where the pivot is positioned. If the document cover is maintained to be open at an angle slightly larger than approximately 90 degrees, a force to further open the document cover due to its own weight acts on an open angle restricting portion of a bearing. Therefore, the strength of the bearing is required to be increased.

Japanese Patent Application Laid-Open No. 2006-184691 suggests that a first component to prevent a document cover from being open at an angle equal to or larger than a specified angle and a second component that acts as a stopper for the first component can be moved to change the opening and closing angle of the document cover. However, it does not discuss any particular configuration.

SUMMARY OF THE INVENTION

According to an aspect of the present invention, an image reading apparatus configured to read a document positioned on a document positioning plate includes an apparatus body, the document positioning plate mounted on the apparatus body, a document cover configured to press the document against the document positioning plate, a hinge member attached to the document cover and rotatably attached to the apparatus body, and a switch member engaging with the hinge member and configured to restrict a rotation angle of the hinge member, wherein the switch member is located on a same side as a side of the document positioning plate of the apparatus body and is configured to restrict, at a first position thereof, the rotation angle of the hinge member to a first open angle and to release, at a second position thereof, the rotation angle of the hinge member from being restricted to the first open angle.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

First Exemplary Embodiment

Figure 1:
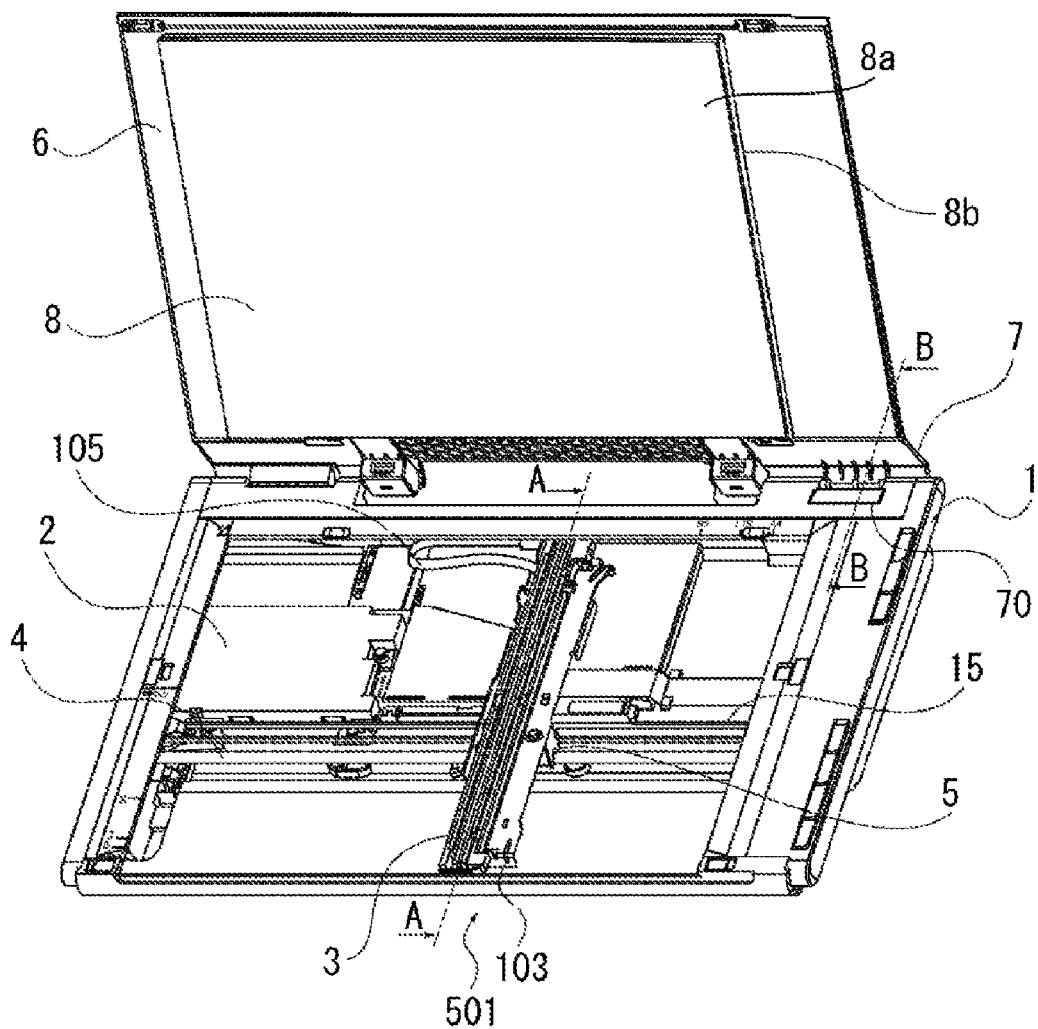
FIG. 1 is a perspective view of an image reading apparatus, with a document cover open, according to an exemplary embodiment of the present invention.

FIG. 1 is a perspective view of a color image reading apparatus according to an exemplary embodiment of the invention. As illustrated in FIG. 1, a document is set on a document positioning glass plate 2, serving as a transparent document positioning plate, attached to the top surface of an apparatus body 1. A contact image sensor 3 can be moved parallel to the document positioning glass plate 2 to scan and read an image of the document.

Three (red, green, and blue (RGB)) color light-emitting diodes (LED) that are light sources for document illumination, a rod lens array by which reflected light from the document is imaged on a light receiving element, and the light receiving element are incorporated into the contact image sensor 3. The three-color light sources are sequentially switched to be alternately turned on and off. The light receiving element reads reflected light from the document for each color. Thus, color separation reading is performed.

The contact image sensor 3 is axially supported by a sensor holder 103 with spacers made of a material with good slidability placed in the left and right ends. The sensor holder 103 is fixedly supported onto a slider 5, which slides on a guide shaft 4 fixed to the apparatus body 1. The left end of the contact image sensor 3 is in press contact with the document positioning glass plate 2 via a spacer interposed therebetween by a spring (not shown) positioned on the sensor holder 103. Hereinafter, a unit in which the contact image sensor 3, the sensor holder 103, the spring (not shown), and the slider 5 are incorporated will be referred to as a carriage 501. A belt 15 is fixed to the slider 5 to transmit power from a motor (not shown) that is a scanning drive source, as illustrated in FIG. 1. Forward and reverse rotation of the motor (not shown) allows reciprocating scanning of the carriage 501 (the contact image sensor 3) in the range of the document positioning glass plate 2. A flexible cable 105 for electrical input and output of the contact image sensor 3 has one end connected to the contact image sensor 3 and the other end connected to a control board (not shown) of the apparatus body 1.

The image reading apparatus includes, in addition to the above-described components, an electrical component unit having a control board and a power source. These components are arranged in the apparatus body 1, which fixedly supports the document positioning glass plate 2.

A document cover 6 is located above the document positioning glass plate 2. The document cover 6 serves as a cover for pressing the document against the document positioning glass plate 2 and is openably and closably attached to the apparatus body 1 via the hinge member 7. A document pressing sheet 8, including a sheet member 8a and an elastic member 8b, is attached to the inner surface of the document cover 6 facing the document positioning glass plate 2.

Figure 2A:
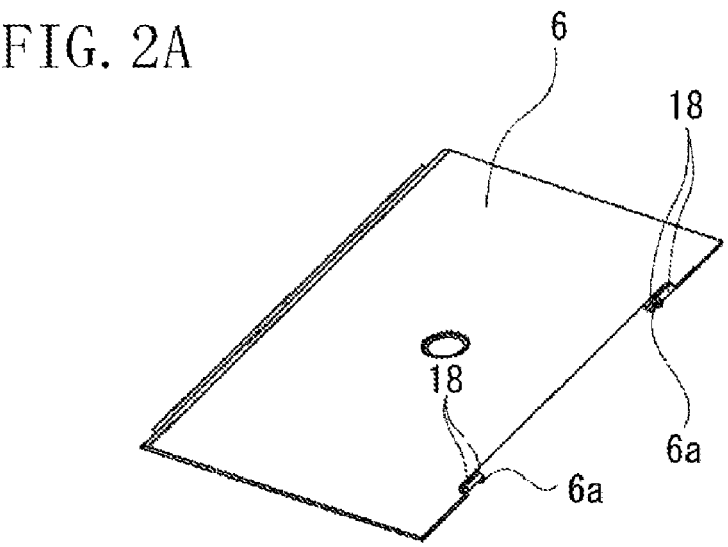
FIGS. 2A to 2C illustrate a document cover and a hinge member of the image reading apparatus according to an exemplary embodiment of the present invention.
Figure 2B:
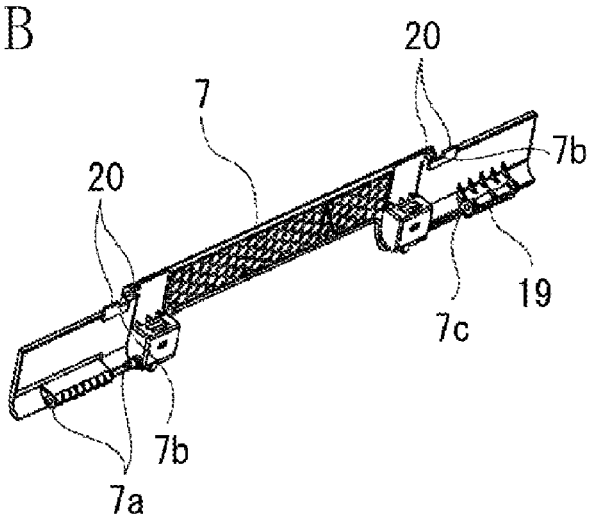
Figure 2C:
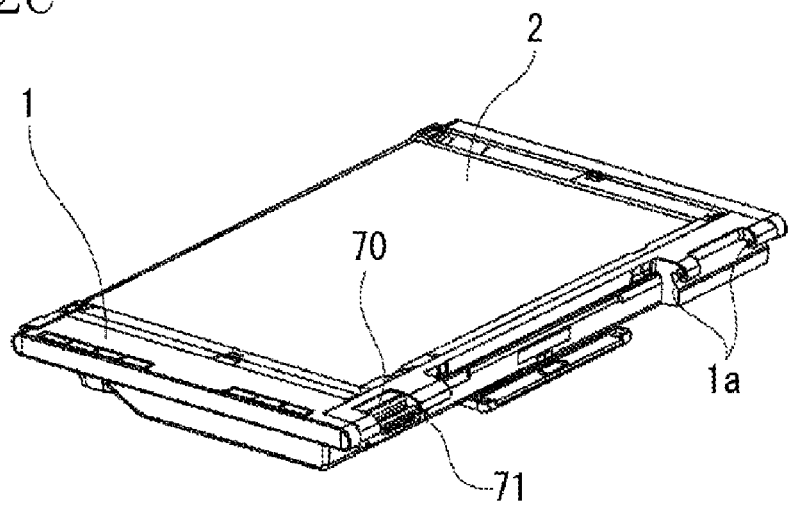
Figure 3A:
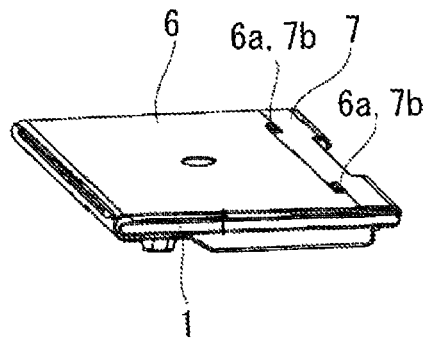
FIGS. 3A to 3D illustrate a plurality of states of the document cover according to an exemplary embodiment of the present invention.
Figure 3B:
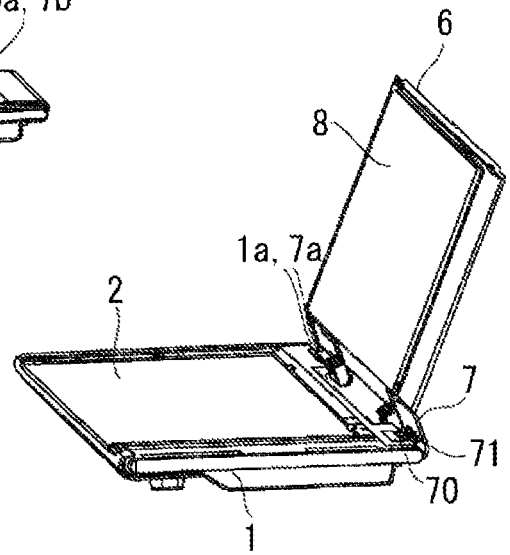
Figure 3C:
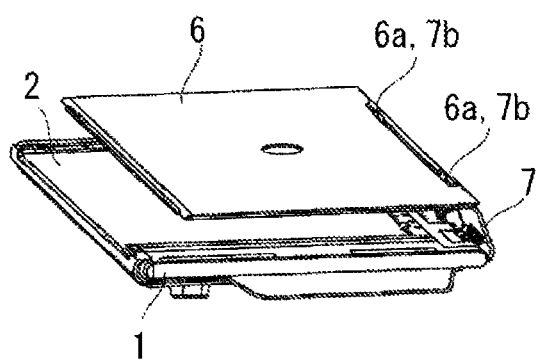
Figure 3D:
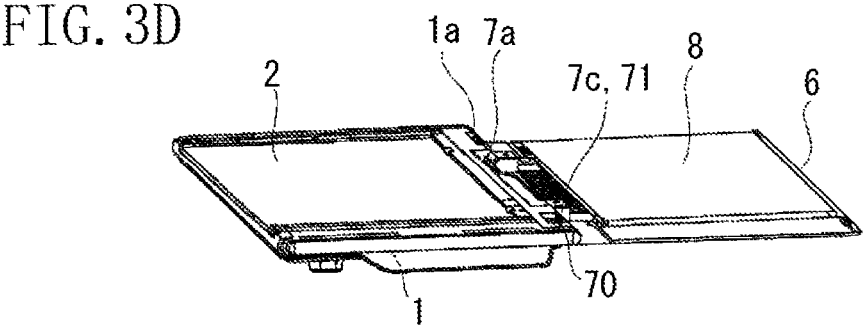

The configuration for opening and closing the document cover 6 with respect to the apparatus body 1 will be described below. FIGS. 2A to 2C illustrate a hinge structure to openably and closably couple the apparatus body 1 with the document cover 6. FIG. 3A illustrates a state where the document cover 6 is closed. FIG. 3B illustrates a state where the document cover 6 is open at approximately 110 degrees. FIG. 3D illustrates a state where the document cover 6 is open at approximately 180 degrees. FIG. 3C illustrates a state where only the hinge member 7 is open at approximately 70 degrees. As illustrated in FIGS. 3A to 3D, opening the document cover 6 at a certain degree of angle enables a user to recognize and operate a switch member 70.

As illustrated in FIGS. 2A to 2C, a shaft 71 and recessed portions 1a are coaxially disposed at the rear end of the apparatus body 1. The hinge member 7 is rotatably supported by the shaft 71 with a hole 7c. Raised portions 7a at the rear end of the hinge member 7 are rotatably supported by the recessed portions 1a. The reason for using the shaft 71 at one side is that the total load of the hinge member 7 and the document cover 6 is applied to this portion when the document cover 6 is open, as will be described later. Further, in the hinge member 7, raised portions 7b are disposed at two portions in parallel to the raised portions 7a and the hole 7c. Recessed portions 6a of the document cover 6 are rotatably supported by the raised portions 7b. Accordingly, the document cover 6 is openably and closably attached to the apparatus body 1 via two pivoting axes as the supporting points. The document cover 6 and the hinge member 7 are provided with protrusions 18 and 20 for restricting a rotation angle, respectively.

Figure 4A:
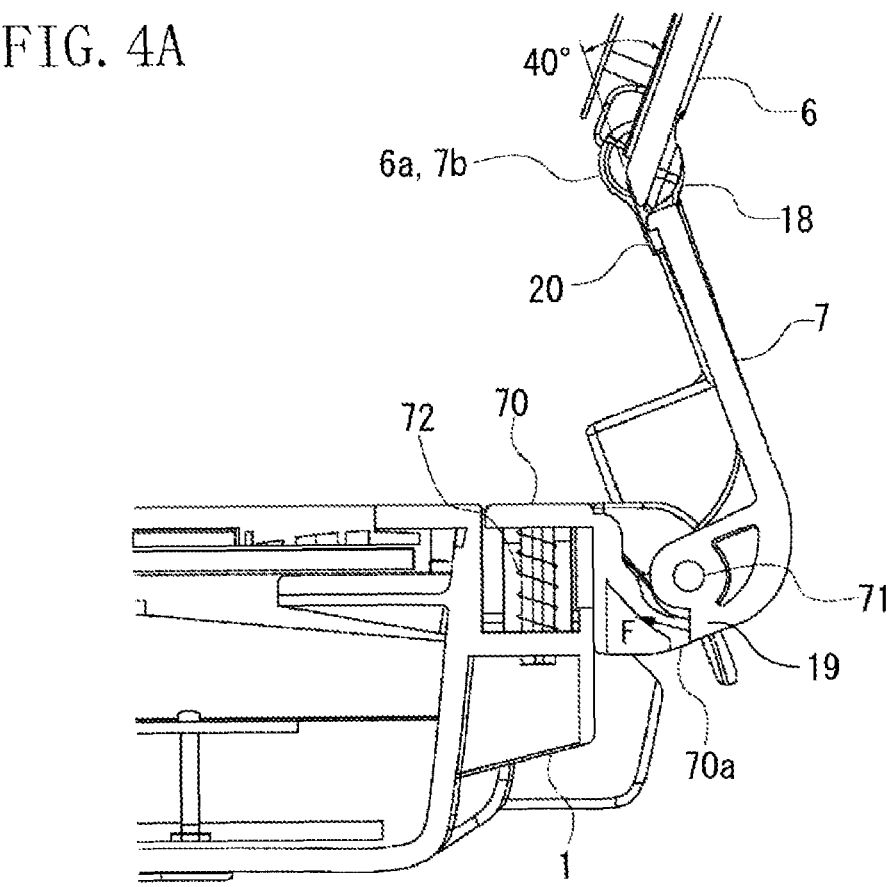
FIGS. 4A and 4B illustrate a switch member according to a first exemplary embodiment of the present invention.
Figure 4B:
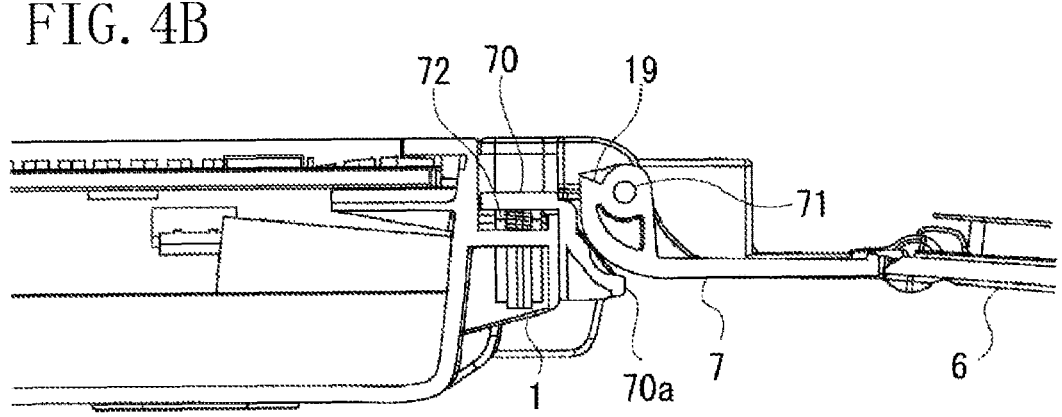

As illustrated in FIGS. 4A and 4B, the switch member 70 is attached to the apparatus body 1 via a spring 72. The switch member 70 can be pressed downward as a user presses the switch member 70 from above. The switch member 70 is restored to the original position by the spring 72 as the user releases the switch member 70 from the pressure.

When a thick document, such as a book, is set on the document positioning glass plate 2 and the document cover 6 is closed, the postures of the document cover 6 and the hinge member 7 are fixed in positions in balance according to the height of the thick document, as illustrated in FIG. 4A. At this point, the hinge member 7 can rotate according to the thickness of the thick document, thus pressing the thick document downward.

When the document cover 6 is normally opened, only the document cover 6 starts opening using the pivot portions 6a and 7b as the center of rotation, as illustrated in FIG. 4A. Then, opening of the document cover 6 is stopped at a rotation angle of approximately 40 degrees with respect to the hinge member 7 by the rotation angle restricting protrusions 18 and 20 provided in the document cover 6 and the hinge member 7. Even if a user intends to open the document cover 6 further, the document cover 6 cannot be opened at an angle larger than this angle with respect to the hinge member 7. Therefore, the hinge member 7 rotates around the shaft 71 while the angle of approximately 40 degrees is maintained. A bump 19 of the hinge member 7 contacts a bump 70a of the switch member 70 at a position where the hinge member 7 is open at a rotation angle of approximately 70 degrees with respect to the document positioning glass plate 2. Since the open posture of the document cover 6 is maintained at this position, a document can be set on the document positioning glass plate 2 without the document cover 6 being manually supported. In this state, the open angle of the hinge member 7 is restricted to approximately 70 degrees.

This state enables a user to recognize and operate the switch member 70. The bump 19 of the hinge member 7 is shaped to have a slightly angled surface to contact the bump 70a of the switch member 70. The force applied to the hinge member 7 (F in FIG. 4A) acts only in a direction to press the switch member 70 upward. Therefore, the switch member 70 cannot move downward even if the total weight of the document cover 6 and the hinge member 7 or an unexpected large force acts on the hinge member 7. In order to support the whole load in the vicinity of the switch member 70 when the document cover 6 and the hinge member 7 are open, the switch member 70 is supported by the apparatus body 1, and the shaft 71 is made of metal.

If a user intends to set, on the document positioning glass plate 2, a document larger than the document positioning glass plate 2, the user can press the switch member 70 downward as illustrated in FIG. 4B. Accordingly, a clearance is formed that allows the bump 19 to further rotate. As a result, the document cover 6 can be opened via the hinge member 7 to be positioned below the document setting surface of the document positioning glass plate 2 on a side opposite to the document positioning glass plate 2. In this state, the open angle of the hinge member 7 is 180 degrees. This state allows a document larger than the document positioning glass plate 2 to be set on the document positioning glass plate 2. At this point, the switch member 70 is pressed upward along the hinge member 7 by the spring 72. The switch member 70 automatically returns to the state illustrated in FIG. 4A when the document cover 6 is closed with the bump 19 away from the bump 70a.

Second Exemplary Embodiment

Figure 5A:
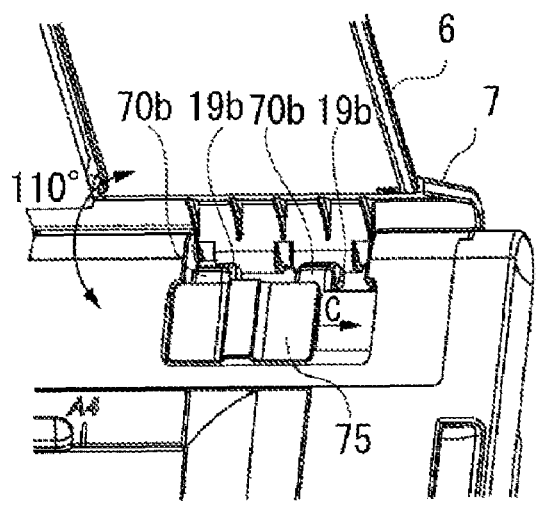
FIGS. 5A to 5C illustrate a switch member according to a second exemplary embodiment of the present invention.
Figure 5B:
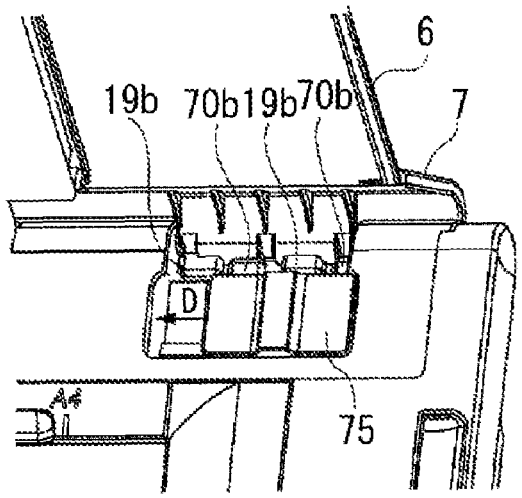
Figure 5C:
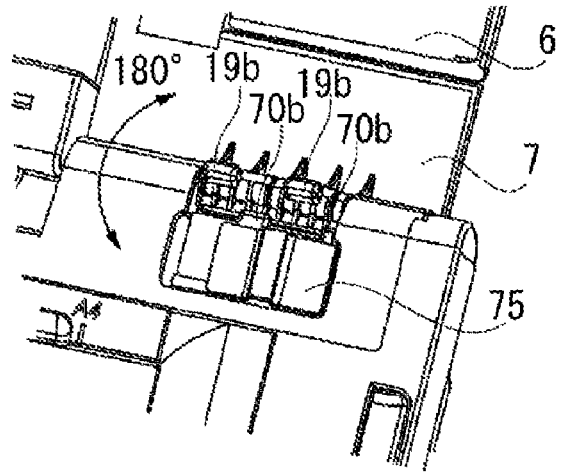

A second exemplary embodiment of the present invention will be described next with reference to FIGS. 5A to 5C. FIGS. 5A to 5C illustrate a configuration of a color image reading apparatus according to the second embodiment. Components other than a switch member 75 that moves in the horizontal direction, bumps 70b thereof, and bumps 19b disposed in the hinge member 7 are similar to those in the first exemplary embodiment. Description of the similar components will not be repeated.

As illustrated in FIGS. 5A to 5C, the switch member 75 is attached to the apparatus body 1 to be movable in the horizontal direction (C-D direction).

When the document cover 6 is normally opened, the hinge member 7 rotates around the shaft 71 in the case where the switch member 75 is at the position illustrated in FIG. 5A. When the bumps 19b of the hinge member 7 contact the bumps 70b of the switch member 75, the document cover 6 stands up at a position where the document cover 6 engages with the hinge member 7. This state makes the switch member 75 operable by a user. The bumps 19b of the hinge member 7 are shaped to have a horizontal surface to contact the bumps 70b of the switch member 75. The force applied to the hinge member 7 acts only in a direction to press the switch member 75 upward. As a result, the switch member 75 cannot move in the horizontal direction. Therefore, the switch member 75 cannot move in the horizontal direction due to the total weight of the document cover 6 and the hinge member 7. Even if an unexpected large force acts on the hinge member 7, the switch member 75 cannot move in the horizontal direction.

In the case where a user intends to open the document cover 6 at an angle of approximately 180 degrees to read a document larger than the document positioning glass plate 2, the user can move the switch member 75 to the right as illustrated in FIG. 5B. This movement forms a clearance that allows the bumps 19b to further rotate. As a result, the bumps 19b of the hinge member 7 do not contact the bumps 70b of the switch member 75, thus allowing the document cover 6 to be opened at angles up to approximately 180 degrees. Thus, a document larger than the document positioning glass plate 2 can be set on the document positioning glass plate 2.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-205946 filed Jul. 28, 2006, which is hereby incorporated by reference herein in its entirety.

What is claimed is:

1. An image reading apparatus configured to read a document positioned on a document positioning plate, the image reading apparatus comprising:
   an apparatus body;
   the document positioning plate mounted on the apparatus body;
   a document cover configured to press the document against the document positioning plate;
   a hinge member attached to the document cover and rotatably attached to the apparatus body; and
   a switch member engaging with the hinge member and configured to restrict a rotation angle of the hinge member,
   wherein the switch member is located on a same side as a side of the document positioning plate of the apparatus body and is configured to restrict, at a first position thereof, the rotation angle of the hinge member to a first open angle and to release, at a second position thereof, the rotation angle of the hinge member from being restricted to the first open angle.

2. The image reading apparatus according to claim 1, wherein the switch member is biased in a direction towards the first position and is at the first position in a state where the document cover is closed to cover the document positioning plate.

3. The image reading apparatus according to claim 1, wherein the switch member is operable by a user with the document cover being open, and the switch member is covered with the document cover with the document cover being closed.

4. The image reading apparatus according to claim 1, wherein the switch member is located between the document positioning plate and an attachment portion of the hinge member to the apparatus body.

5. The image reading apparatus according to claim 1, wherein the hinge member is rotatably attached to the document cover.

6. The image reading apparatus according to claim 5, wherein a rotation angle of the document cover with respect to the hinge member is restricted to a second open angle.

7. The image reading apparatus according to claim 6, wherein, in a case where the switch member is at the first position, the rotation angle of the hinge member is restricted to the first open angle and the rotation angle of the document cover with respect to the hinge member is restricted to the second open angle.

8. The image reading apparatus according to claim 1, wherein the first open angle is in a range of 60 degrees to 80 degrees.

9. The image reading apparatus according to claim 6, wherein the second open angle is in a range of 30 degrees to 50 degrees.

10. The image reading apparatus according to claim 1, wherein, in a case where the switch member is at the second position, the document cover is rotatable at an angle of 180 degrees or more with respect to the document positioning plate.

11. A cover assembly for use with an apparatus operable to scan a document positioned on a document positioning plate, the cover assembly comprising:
    a document cover configured to cover a document placed on the document positioning plate;
    a hinge member attached to the document cover and pivotably attachable to the apparatus; and
    a switch member engaging with the hinge member and configured to restrict a pivoting angle of the hinge member, wherein the switch member is configured to restrict, at a first position thereof, a pivoting angle of the hinge member with respect to the document positioning plate to a first open angle and to release, at a second position thereof, the pivoting angle of the hinge member with respect to the document positioning plate from being restricted to the first open angle.

12. The cover assembly according to claim 11, wherein the switch member is mountable on a same side as a side of the document positioning plate of the apparatus.

13. The cover assembly according to claim 11, wherein the document cover is pivotably attached to the hinge member such that a pivoting angle of the document cover with respect to the hinge member is restricted to a maximum open angle in a range of 30 degrees to 50 degrees.

14. The cover assembly according to claim 11, wherein, in a case wherein the switch member is at the first position, a pivoting angle of the hinge member with respect to the document positioning plate is restricted to the first maximum open angle in a range of 60 degrees to 80 degrees.

* * * * *